(12) United States Patent
Sengupta et al.

(10) Patent No.: US 10,575,550 B2
(45) Date of Patent: *Mar. 3, 2020

(54) EMULSION/COLLOID MEDIATED FLAVOR ENCAPSULATION AND DELIVERY WITH TOBACCO-DERIVED LIPIDS

(71) Applicant: Philip Morris USA Inc., Richmond, VA (US)

(72) Inventors: Tapashi Sengupta, Frisco, TX (US); Munmaya K. Mishra, Richmond, VA (US); Douglas A. Fernandez, Henrico, VA (US); William R. Sweeney, Richmond, VA (US); Tony M. Howell, Richmond, VA (US)

(73) Assignee: Philip Morris USA Inc., Richmond, VA (US)

( * ) Notice: Subject to any disclaimer, the term of this patent is extended or adjusted under 35 U.S.C. 154(b) by 273 days.

This patent is subject to a terminal disclaimer.

(21) Appl. No.: 15/678,726

(22) Filed: Aug. 16, 2017

(65) Prior Publication Data

US 2017/0340004 A1    Nov. 30, 2017

Related U.S. Application Data

(63) Continuation of application No. 13/071,931, filed on Mar. 25, 2011, now Pat. No. 9,743,688.

(60) Provisional application No. 61/318,228, filed on Mar. 26, 2010.

(51) Int. Cl.
*A24B 15/28* (2006.01)
*A23L 27/00* (2016.01)

(52) U.S. Cl.
CPC ............ *A24B 15/283* (2013.01); *A23L 27/72* (2016.08); *A23V 2002/00* (2013.01)

(58) Field of Classification Search
None
See application file for complete search history.

(56) References Cited

U.S. PATENT DOCUMENTS

| | | | |
|---|---|---|---|
| 2,800,457 A | 7/1957 | Green et al. |
| 2,800,458 A | 7/1957 | Green et al. |
| 3,712,867 A | 1/1973 | Schon et al. |
| 4,200,113 A | 4/1980 | Schmidt |
| 4,389,419 A | 6/1983 | Lim et al. |
| 4,446,165 A | 5/1984 | Roberts |
| 4,506,682 A | 3/1985 | Muller |

(Continued)

FOREIGN PATENT DOCUMENTS

| | | |
|---|---|---|
| EP | 0453397 A1 | 10/1991 |
| WO | 9319622 A1 | 10/1993 |

(Continued)

OTHER PUBLICATIONS

International Search Report and Written Opinion dated Aug. 17, 2011 for PCT/IB2011/000980.

(Continued)

*Primary Examiner* — Michael J Felton
(74) *Attorney, Agent, or Firm* — Buchanan Ingersoll & Rooney PC

(57) ABSTRACT

Flavorants are emulsified in tobacco-derived lipids and encapsulated with biopolymers and polysaccharides. The emulsions include oil-in-water emulsions, oil-in-water-in-oil emulsions, water-in oil emulsions, or water-in-oil-in-water emulsions, and optionally include ethanol and/or propylene glycol in an oil phase.

24 Claims, 1 Drawing Sheet

(56) References Cited

U.S. PATENT DOCUMENTS

| | | | |
|---|---|---|---|
| 4,835,002 | A | 5/1989 | Wolf et al. |
| 4,946,624 | A | 8/1990 | Michael |
| 5,126,061 | A | 6/1992 | Michael |
| 5,186,185 | A | 2/1993 | Mashiko et al. |
| 5,266,335 | A | 11/1993 | Cherukuri et al. |
| 5,407,609 | A | 4/1995 | Tice et al. |
| 5,498,439 | A | 3/1996 | Bonner |
| 5,500,223 | A | 3/1996 | Behan et al. |
| 5,603,952 | A | 2/1997 | Soper |
| 5,690,990 | A | 11/1997 | Bonner |
| 5,700,397 | A | 12/1997 | Maeda et al. |
| 5,759,599 | A | 6/1998 | Wampler et al. |
| 6,325,859 | B1 | 12/2001 | DeRoos et al. |
| 6,608,017 | B1 | 8/2003 | Dihora et al. |
| 6,703,062 | B1 | 3/2004 | Appleqvist et al. |
| 6,929,814 | B2 | 8/2005 | Bouwmeesters et al. |
| 2003/0008040 | A1 | 1/2003 | Soeda et al. |
| 2004/0001891 | A1 | 1/2004 | Smith et al. |
| 2004/0032036 | A1 | 2/2004 | Subramaniam et al. |
| 2004/0041306 | A1 | 3/2004 | Subramaniam et al. |
| 2004/0213849 | A1 | 10/2004 | Sowden et al. |
| 2005/0000531 | A1 | 1/2005 | Shi |
| 2005/0123757 | A1 | 6/2005 | Subramaniam et al. |
| 2005/0172976 | A1 | 8/2005 | Newman et al. |
| 2005/0244521 | A1 | 11/2005 | Strickland et al. |
| 2006/0090769 | A1 | 5/2006 | Woodson et al. |
| 2006/0130861 | A1 | 6/2006 | Luan et al. |
| 2006/0144412 | A1 | 7/2006 | Mishra et al. |
| 2006/0165990 | A1 | 7/2006 | Curtis et al. |
| 2006/0174901 | A1 | 8/2006 | Karles et al. |
| 2006/0191548 | A1 | 8/2006 | Strickland et al. |
| 2007/0012327 | A1 | 1/2007 | Karles et al. |
| 2007/0098853 | A1 | 5/2007 | Van Lengerich et al. |
| 2007/0098854 | A1 | 5/2007 | Van Lengerich et al. |
| 2007/0104866 | A1 | 5/2007 | McClements et al. |
| 2007/0186941 | A1 | 8/2007 | Holton, Jr. et al. |
| 2007/0261707 | A1 | 11/2007 | Winterson et al. |
| 2008/0156336 | A1 | 7/2008 | Wyss-Peters et al. |
| 2008/0202536 | A1 | 8/2008 | Torrence et al. |
| 2009/0004333 | A1 | 1/2009 | Nakhasi et al. |
| 2009/0014018 | A1 | 1/2009 | Sengupta et al. |
| 2009/0022856 | A1 | 1/2009 | Cheng et al. |
| 2011/0083681 | A1 | 4/2011 | Sengupta et al. |
| 2011/0104218 | A1 | 5/2011 | Karles et al. |

FOREIGN PATENT DOCUMENTS

| | | | |
|---|---|---|---|
| WO | 0235932 A1 | 5/2002 | |
| WO | 2009022909 A1 | 2/2009 | |

OTHER PUBLICATIONS

International Preliminary Report on Patentability dated Oct. 2, 2012 for PCT/IB2011/000980.

Kouchemal, K., "Simultaneous Emulsification and Interfacial Polycondensation for the Preparation of Colloidal Suspensions of Nanocapsules (Abstract)," Materials Science and Engineering: C, vol. 26, Issues 2-3, Mar. 2006, pp. 472-480, 2005, Elsevier B.V., ScienceDirect—Materials Science and Engineering, http://www.sciencedirect.com/science?_ob=ArticleURL&_udi=B6TXG-4HM7RWK-5&_u . . . Jan. 7, 2008 (2 pages).

Nissim Garti, Anan Yaghmur, Martin E. Leser, Veronique Clement and Heribert J. Watzke, "Improved Oil Solubilization in Oil/Water Food Grade Microemulsions in hte Presence of Polyols", Journal of Agricultural and Food Chemistry 2001 49(5), 2552-2562 DOI:10.1021/jf001390b.

Howell, TM, "Tobacco Wax Solubility in Carbon Dioxide", 1989 (added to database 2002), accesses via http://legacy.library.ucsf.edu/tiddnu17e00 Nov. 3, 2014.

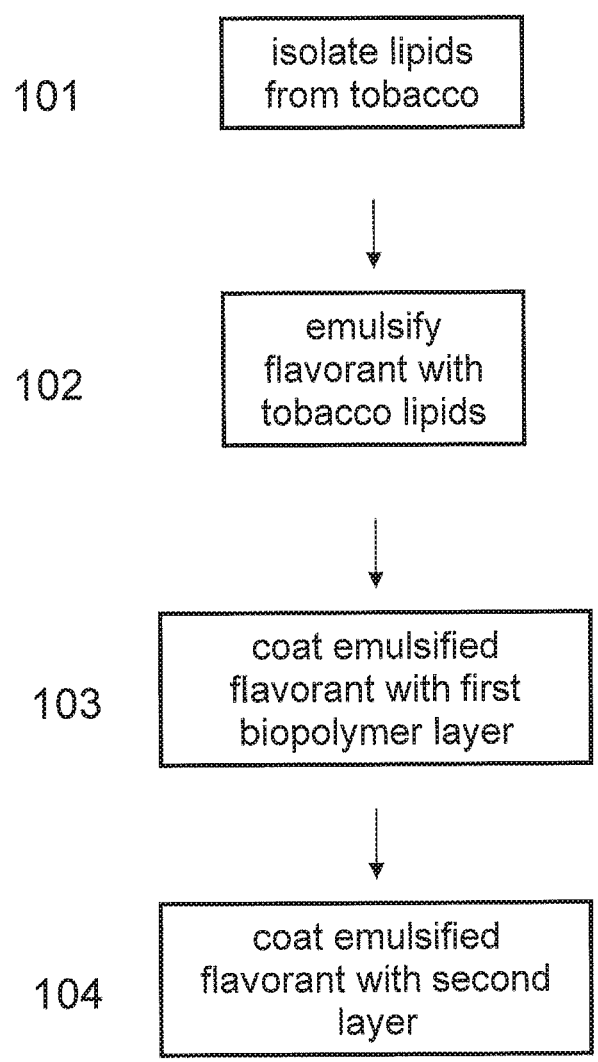

EMULSION/COLLOID MEDIATED FLAVOR ENCAPSULATION AND DELIVERY WITH TOBACCO-DERIVED LIPIDS

CROSS REFERENCE TO RELATED APPLICATION

This application is a continuation patent application of U.S. patent application Ser. No. 13/071,931, filed on Mar. 25, 2011, which claims priority under 35 U.S.C. § 119(e) to U.S. Provisional Application No. 61/318,228, filed on Mar. 26, 2010, the entire content of which are incorporated herein by reference thereto.

BACKGROUND

A need exists for incorporation of oil or water soluble flavors in solid encapsulated shells, in order to prevent flavor volatilization, oxidation, or other chemical changes leading to loss of desired flavors and/or acquisition of unwanted flavor. A need also exists for encapsulation of flavors possessing multiple timed release profiles for different flavors. Moreover, a need exists for encapsulated flavors having ease of use in different matrices and in smokeable or smokeless products.

SUMMARY

In one embodiment is provided an encapsulated flavorant, comprising (a) a core comprising a flavorant emulsified in a tobacco-derived lipid; (b) a first biopolymer layer substantially surrounding the core and comprising a biopolymer selected from the group consisting of amphoteric proteins, cationic proteins, cationic polysaccharides, and nonionic polysaccharides; and (c) a second layer substantially surrounding the first biopolymer layer and comprising an anionic polysaccharide.

In another embodiment, a method of making an encapsulated flavorant comprises the steps of: (a) preparing an emulsified flavorant comprising a flavorant emulsified in a tobacco-derived lipid; (b) coating the emulsified flavorant with a first biopolymer layer comprising a biopolymer selected from the group consisting of amphoteric proteins, cationic proteins, cationic polysaccharides, and nonionic polysaccharides, to produce a first capsule of the first biopolymer layer substantially surrounding a core of emulsified flavorant; and (c) coating the first capsule with a second layer substantially surrounding the first layer and comprising an anionic polysaccharide to form an encapsulated flavorant.

BRIEF DESCRIPTION OF THE DRAWING FIGURES

FIG. 1 illustrates an exemplary method of preparing encapsulated flavorant as described herein.

DETAILED DESCRIPTION OF THE INVENTION

As used herein, the term "orally enjoyable" denotes the ability of a material or product to be enjoyed and at least partially consumed via the mouth. An orally enjoyable product can take the form of a tablet, stick, chewable gum, spongy material, foam, cream, pellet, or fiber, or a form suitable to be contained in a pouch, or combinations of these. Examples of orally enjoyable products include chewable or non-chewable edible forms, including tablets, gels, gums, flavored sponges, pouched products, lozenges, flavor strips, and the like. Further examples of orally enjoyable products include tobacco-free pouchless or pouched products and smokeless tobacco such as oral delivery products including chewing tobacco, tobacco pouch products, and the like.

As used herein, the term "encapsulate" denotes to substantially surround. It includes encapsulation with liquids, solid, and/or gels.

As used herein, the term "about" when used in conjunction with a stated numerical value or range has the meaning reasonably ascribed to it by a person skilled in the art, i.e. denoting somewhat more or somewhat less than the stated value or range, to within a range of ±10% of the stated value.

The methods and products described herein relate to the preparation and application of encapsulated flavors and/or ingredients to obtain enhanced sustained release of flavors and/or ingredients. The encapsulated flavors and/or ingredients as described herein could be used in edible and non-edible products, and smokeless and smokeable products.

Flavorants

Exemplary flavorants include, but are not limited to, berry flavors such as pomegranate, acai, raspberry, blueberry, strawberry, boysenberry, and/or cranberry. Other suitable flavorants include, without limitation, any natural or synthetic flavor or aroma, such as menthol, peppermint, spearmint, wintergreen, bourbon, scotch, whiskey, cognac, hydrangea, lavender, chocolate, licorice, citrus and other fruit flavors, such as apple, peach, pear, cherry, plum, orange, lime, grape, and grapefruit, gamma octalactone, vanillin, ethyl vanillin, breath freshener flavors, butter, rum, coconut, almond, pecan, walnut, hazelnut, french vanilla, macadamia, sugar cane, maple, cassis, caramel, banana, malt, espresso, kahlua, white chocolate, spice flavors such as cinnamon, clove, cilantro, basil, oregano, garlic, mustard, nutmeg, rosemary, thyme, tarragon, dill, sage, anise, and fennel, methyl salicylate, linalool, jasmine, coffee, olive oil, sesame oil, sunflower oil, bergamot oil, geranium oil, lemon oil, ginger oil, balsamic vinegar, rice wine vinegar, and red wine vinegar. Preferred flavors include cinnamol, tymool, and/or tea tree.

Emulsification

It is possible to emulsify oil soluble flavorants such as menthol by dissolving them in suitable lipid (such as vegetable, mineral, olive oils, phytosterols, and/or other oils and waxes from tobacco, soy plants, and other plants producing appropriate oils) and stabilizing the oil-in-water emulsions via adsorption of biopolymers or surfactants at the oil/water interface. The flavorant is emulsified in a lipid derived from a tobacco plant. Additionally, the emulsion may be stabilized by increasing the viscosity of the continuous phase with biopolymers.

Oil-in-water ("O/W"), oil-in-water-in-oil ("O/W/O"), water-in oil ("W/O"), or water-in-oil-in-water ("W/O/W") emulsions may be used for dissolving oil soluble and water soluble flavors/ingredients simultaneously and for their dispersion in polar or non-polar matrices.

Preferably, oil soluble flavorants are emulsified by dissolving them in tobacco-derived lipids and stabilizing the oil/water interface with, for example, (a) single or mixed surfactants, (b) single or mixed biopolymers, (c) complex coacervates formed between polysaccharides and/or oligosaccharides, proteins, or mixtures of these, or (d) crosslinked layers of proteins, polysaccharides and/or oligosaccharides, or mixtures of these.

Oil soluble flavors/ingredients are dissolved in an oil phase of tobacco-derived lipids including phytosterols, oils, and/or waxes from tobacco, and then emulsified with an appropriate emulsifier. For example, several paraffinic oils/waxes constituting C20-C42 fractions (that is, lipids having from 20 to 42 carbons in their polymer chains) can be found at 20 to 40% (w/w) in tobacco plants. Such lipids are obtainable by stem washing or from a dry ice expanded tobacco process. Some amount of ethanol or propylene glycol may be incorporated in the tobacco-derived lipid, as well as one or more additional lipids such as mineral oil, and edible plant-derived oils beyond the tobacco-derived lipid, including vegetable oil, olive oil.

Preferred emulsifiers include simple surfactants such as sorbitan esters of fatty acids, glyceryl/polyglyceryl esters of fatty acids, glycerin esters of fatty acids such as monoglycerides, acetic acid esters of monoglycerides such as acetylated monoglyceride, lactic acid esters of monoglycerides such as lactylated monoglyceride, citric acid esters of monoglycerides, succinic acid esters of monoglycerides, diacetyl tartaric acid esters of monoglycerides, polyglycerol esters of fatty acids, polyglycerol polyricinoleate, propylene glycol esters of fatty acids, sugar esters of fatty acids including sucrose esters, calcium and/or sodium stearoyl-2-lactate, polysorbates, Aerosol OT (sodium bis(2-ethylhexyl) sulfosuccinate), surface active phospholipids/lecithins including enzyme-digested lecithins, glycolipids, carbohydrate based surfactants, poly/oligo saccharides, proteins (including milk proteins, soy proteins, whey proteins, egg white proteins, gelatin, wheat proteins, tobacco protein fractions), protein hydrosylates, stearoyl lactylate and salts thereof, stearoyl fumarate and salts thereof, glyceryl monosterarate, and detergents of the SPAN® or TWEEN® series. The agents from the above series may be used singly or in combination. Furthermore, diblock copolymers such as types using poly (oxyethylene) ("PEO") and poly(oxypropylene) ("PPO"), i.e. PEO/PPO types and triblock copolymers (PEO/PPO/PEO types) can be used for emulsion stabilization. The emulsifiers or surfactants may be anionic, cationic, amphoteric, non-ionic or neutral. Those having a higher hydrophile-lipophile balance ("HLB") will favor oil-in water emulsion formation, while lower HLB surfactants/emulsifiers will favor the water-in oil emulsion formation.

The result may be in the form of oil-in-water ("O/W") emulsions, oil-in-water-in-oil ("O/W/O") emulsions, water-in-oil ("W/O") emulsions, or water-in-oil-in-water ("W/O/W") emulsions, depending on the polarity of the bulk matrix. In the O/W/O emulsions, the water phase may be thickened by biopolymers. Preferably, both interfaces should be stabilized with surface active agents for multiple emulsion stability. In the W/O/W emulsions, both water phases may be thickened by biopolymers and both interfaces should preferably be stabilized with surface active agents for multiple emulsion stability. This scheme provides for incorporation of both oil soluble and water soluble flavors/ingredients simultaneously for time-released and multiple release delivery.

The O/W emulsions can be made by first dispersing the oil in water with suitable surfactants dissolved in the water phase using a high shear mixer, for example a SILVERSON® L4R type mixer. Desirably, the emulsified flavorant can be formed into droplets having a diameter of from 50-1000 nm before coating with the first biopolymer layer. For example, coarse 1-10 micron droplets may be further reduced to 50-1000 nm by passing through a MICROFLUIDIZER® fluid processor for several passes under an air pressure of 40-95 psig (2.76 to 6.55 bar above atmospheric pressure). In the case of O/W emulsions, the first emulsion can be dispersed in the second oil phase containing surfactants by a low level of shear. A corresponding process can be used for W/O or W/O/W emulsions, by sequentially mixing phases as desired.

Emulsion Stabilization and Encapsulation

The interface between the oil droplets and the continuous water phase may be strengthened by using appropriate (a) single or mixed surfactants, (b) single or mixed biopolymers, (c) complex coacervates formed between poly/oligo saccharides, proteins or mixtures of these, or (d) crosslinked layers of proteins, poly/oligosaccharides or mixtures of these. Emulsions can be stabilized against flocculation and coalescence induced by attractive Van der Waals and hydrophobic interactions between oil drops by using one or many of the repulsive and stabilizing electrostatic (electrical double layer), steric or hydration interactions among the interfacial layers of the oil drops. Denatured proteins at the interface tend to form a very stable interfacial layer, favorable for emulsion stability.

Emulsions containing flavors/ingredients in an oil phase are preferably stabilized by an interfacial biopolymer coacervate layer, which may be ionic, or neutral, or have both ionic and neutral characteristics. The oil drops may preferably be encapsulated within a shell comprising of two polymeric layers having proteins and polysaccharides via coacervate formation between the two biopolymers. The mode of adsorption of the protein at the oil/water interface is primarily due to attractive, electrostatic, hydrophobic, and/or Van der Waals forces. The mode of binding between the protein and the polysaccharide layers is due to mainly electrostatic and secondarily van der Waals and hydrophobic attractive forces. Such coacervates can be spray dried or freeze dried depending on the volatility of the flavorant.

A variety of surfactants may serve as encapsulants, including but not limited to simple surfactants, phospholipids, glycolipids, carbohydrate based surfactants including polysaccharides and/or oligosaccharides (e.g., alginate), proteins (including milk proteins, soy proteins, whey proteins, egg white proteins, gelatin, wheat proteins, tobacco protein fractions), protein hydrosylates, or mixtures of any of these.

The first biopolymer layer may include an amphoteric or positively charged protein from the milk protein, whey protein, egg white protein, soy protein, wheat protein, tobacco protein fractions from tobacco extract, gelatin, or protein hydrosylates. The charge on the protein can be optimized by manipulating the pH of the aqueous solution.

The first biopolymer layer may also include a cationic polysaccharide such as chitosan, quaternary cellulosic polymers such as polyquat-4, or other modified cationic polysaccharides.

The first biopolymer layer may be also of nonionic polysaccharides such as propylene glycol ester of alginic acid, hydroxyl propyl methyl cellulose, methyl cellulose, modified starches, or polyvinyl pyrrolidone.

The second layer of the shell may be preferentially of an anionic polysaccharide at the solution pH, such as carrageenans, gum arabic, carboxymethyl cellulose ("CMC"), pectins, sodium alginates, gum tragacanth, or xanthan gum.

Whether a component of a shell is anionic, cationic, or amphoteric in nature is based properties while in a solution at a pH suitable for formation of the encapsulated flavorant.

One or more additional coatings may be added in order to manipulate the release profile and/or create a desired texture, such as a slimy, rough, and/or crunchy.

The encapsulated flavorant may swell in the mouth, and will create a pleasant in-mouth feel when mixed with saliva and other food ingredients such as sugars, starches, polyols, oils, lipids, waxes, fats, fatty acids, glycerides, etc.

The outermost polysaccharide layer may be preferentially optimized in terms of its swelling behavior and viscoelasticity under physiological pH and temperature conditions, for controlling the extraction kinetics of materials. The release of flavorant/ingredients may be triggered by simple diffusion or application of pressure by tongue and chewing. The coat will preferably be stable for a limited time of 1-20 min under the influence of the enzymes in saliva.

FIG. 1 schematically illustrates an exemplary method of preparing encapsulated flavorant. Lipids are isolated from tobacco 101 and combined with a flavorant in the formation of an emulsion 102. The emulsified flavorant is then coated with a first biopolymer layer 103 after which it is coated with the second layer 104. In an embodiment, the encapsulated flavorant can be in the form of a bead or powder having a diameter of 1-2000 microns, e.g., by optionally drying or partially drying the coated emulsified flavorant.

The coatings of the flavorants, dispersed in edible products, will preserve the flavorants from volatilization, oxidation/discoloration or other chemical transformation, extreme pHs of the surrounding medium, and interaction with other ingredients of the bulk matrix. The coatings may also provide sustained release or multiple release profiles for various flavors and/or ingredients, depending on the type of coating applied and the matrix used. The coating may facilitate sustained release of flavorants from edible and/or non-edible products via a slow-release mechanism, with or without chewing. These encapsulated flavorants may be applicable in smokeless or smokeable products. The method and examples of coating are given below.

The encapsulated flavorant may be incorporated in many different orally enjoyable, chewable or non-chewable forms of tobacco and non-tobacco products, for example tablets, candies, gums, chocolates, sponges, and smokeless forms of tobacco. Examples of smokeless tobacco products wherein the disclosed encapsulated flavors can be used include pouched products, snuff, snus, and the like. The encapsulated flavorant may also be incorporated into a smoking article.

The encapsulated flavorant may be combined with a tobacco or non-tobacco product in any number of ways. The encapsulated flavorant may be in the filling of a pouched product. It may be provided in a smoking rod or filter of a smoking article. The encapsulated flavorant as described herein may serve as a provider of flavor in smoking articles as described in commonly-assigned U.S. Patent Application Publication Nos. 2006/0130861 and 2008-0156336, each of which is incorporated herein by reference. The encapsulated flavorant may be provided in or on a layer of a pouched tobacco product or non-tobacco pouched product. The encapsulated flavorant as described herein may serve as a provider of flavor in pouched products U.S. Patent Application Publication Nos. 2007/0261707, 2008/0202536, and 2009/0022856 each of which is incorporated herein by reference.

Example

Oil drops containing menthol have been effectively encapsulated with a first capsule of sodium caseinate or soy protein and a second capsule of kappa-carrageenan or pectin.

While the invention has been described in detail with reference to preferred embodiments thereof, it will be apparent to one skilled in the art that various changes can be made, and equivalents employed, without departing from the scope of the invention.

All of the above-mentioned references are herein incorporated by reference in their entirety to the same extent as if each individual reference was specifically and individually indicated to be incorporated herein by reference in its entirety.

Although the invention has been described with reference to particular embodiments and examples, it should be understood that various modifications can be made without departing from the spirit of the invention. The various parts of the disclosure including the abstract, summary, and the title are not to be construed as limiting the scope of the present invention, as their purpose is to enable the appropriate authorities, as well as the general public, to quickly determine the general nature of the invention. Unless the term "means" is expressly used, none of the features or elements recited herein should be construed as means-plus-function limitations pursuant to 35 U.S.C. § 112, ¶6. Accordingly, the invention is limited only by the claims.

What is claimed is:

1. A method of making an encapsulated flavorant, comprising the steps of:
   (a) preparing an emulsified flavorant by mixing a flavorant, a tobacco-derived lipid and optionally water, wherein the tobacco derived lipid is a C20 to C42 fraction;
   (b) coating droplets of the emulsified flavorant with a first layer comprising a biopolymer selected from the group consisting of amphoteric proteins, cationic proteins, cationic polysaccharides, and nonionic polysaccharides;
   (c) coating the first layer with a second layer substantially surrounding the first layer and comprising an anionic polysaccharide to form an encapsulated flavorant; and
   (d) drying the droplets to form beads or powder of the encapsulated flavorant.

2. The method of claim 1, wherein the tobacco-derived lipid is a C20 to C42 fraction isolated from tobacco plants by a dry ice expanded tobacco process.

3. The method of claim 1, wherein the droplets are dried by freeze drying.

4. The method of claim 1, wherein the flavorant is menthol emulsified using glyceryl esters of fatty acids, the first layer is soy protein and the second layer is sodium alginate.

5. The method of claim 1, wherein the emulsified flavorant is formed into droplets having a diameter of from 50-1000 nm before coating with the first biopolymer layer.

6. The method of claim 1, wherein second layer is sodium alginate.

7. The method of claim 1, wherein the emulsified flavorant is prepared using a high-shear mixer.

8. The method of claim 1, wherein the emulsified flavorant comprises an oil-in-water-in-oil emulsion.

9. An encapsulated flavorant, comprising:
   (a) a core comprising a flavorant, a tobacco-derived lipid and optionally water, wherein the tobacco derived lipid is a C20 to C42 fraction;

(b) a first layer substantially surrounding the core, the first layer comprising a biopolymer selected from the group consisting of amphoteric proteins, cationic proteins, cationic polysaccharides, and nonionic polysaccharides; and (c) a second layer substantially surrounding the first layer, the second layer comprising an anionic polysaccharide.

10. The encapsulated flavorant of claim 9, wherein said emulsified flavorant comprises a continuous phase.

11. The encapsulated flavorant of claim 9, wherein said emulsified flavorant is emulsified by one or more surfactants.

12. The encapsulated flavorant of claim 9, comprising an emulsifier selected from the group consisting of sorbitan esters of fatty acids, glyceryl esters of fatty acids, and glycerin esters of fatty acids.

13. The encapsulated flavorant of claim 9, wherein the first layer comprises soy protein.

14. The encapsulated flavorant of claim 9, wherein said anionic polysaccharide is sodium alginate.

15. The encapsulated flavorant of claim 9, wherein the anionic polysaccharide is selected from the group consisting of kappa-carrageenan and pectins.

16. The encapsulated flavorant of claim 9, wherein said encapsulated flavorant is a bead having a diameter of 1-2000 microns.

17. The encapsulated flavorant of claim 9, wherein said encapsulated flavorant breaks down under the influence of enzymes in saliva.

18. An orally-enjoyable product, comprising smokeless tobacco, and an encapsulated flavorant according to claim 9.

19. Encapsulated menthol, comprising:
(a) a core comprising menthol, a tobacco-derived lipid and optionally water, wherein the tobacco derived lipid is a C20 to C42 fraction;
(b) a first layer substantially surrounding the core, the first layer comprising soy protein; and
(c) a second layer substantially surrounding the first layer, the second layer comprising sodium alginate,
wherein the encapsulated menthol takes the form of a bead or powder having a diameter of 1-2000 microns.

20. The method of claim 1, wherein the emulsified flavorant is prepared by preparing a first oil-in-water emulsion and dispersing the first oil-in-water emulsion in a second oil phase containing surfactants.

21. The method of claim 1, wherein the flavorant is a water soluble flavorant.

22. The method of claim 1, wherein the flavorant is an oil soluble flavorant dissolved in an oil-phase of the tobacco-derived lipid.

23. The encapsulated flavorant of claim 9, wherein the flavorant is a water soluble flavorant.

24. The encapsulated flavorant of claim 9, wherein the flavorant is an oil soluble flavorant dissolved in an oil-phase of the tobacco derived lipid.

* * * * *